July 16, 1957
M. L. OSCARD
2,799,024
COLLAR STIFFENER
Filed Feb. 8, 1954
2 Sheets-Sheet 1
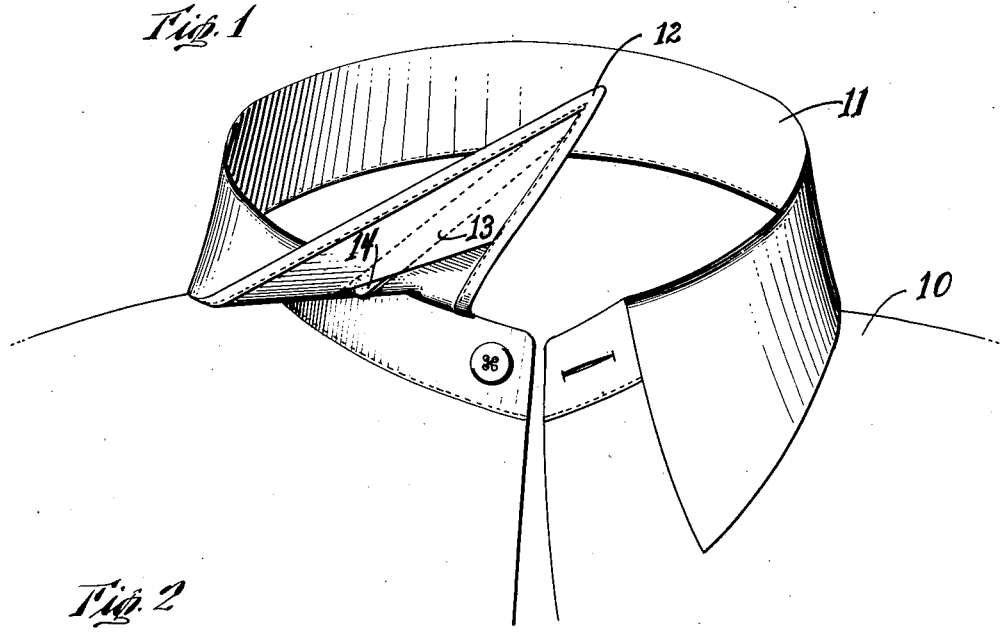
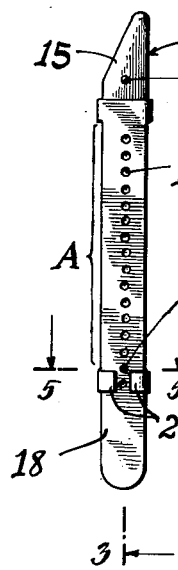
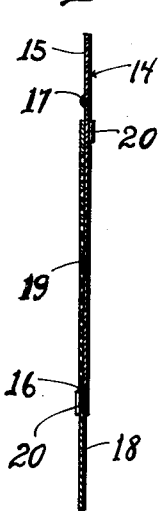
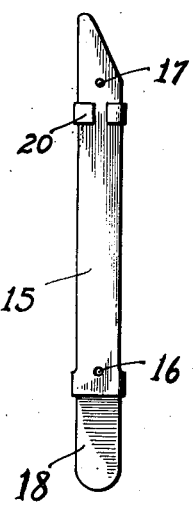
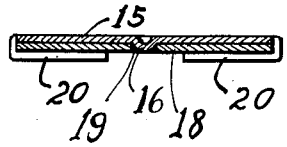
INVENTOR.
Martin L. Oscard
BY
Duell and Kane
ATTORNEYS July 16, 1957  M. L. OSCARD  2,799,024
COLLAR STIFFENER
Filed Feb. 8, 1954
2 Sheets-Sheet 2
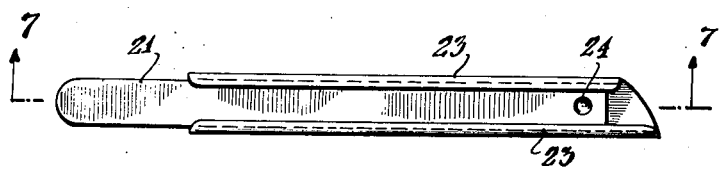
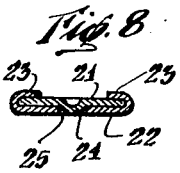
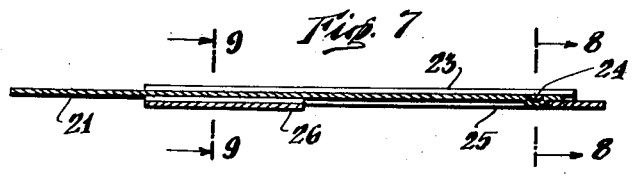
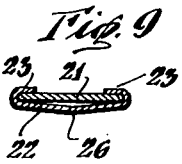
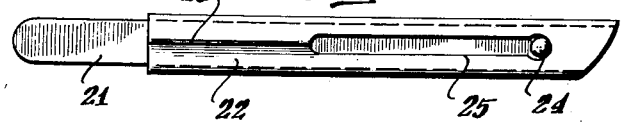
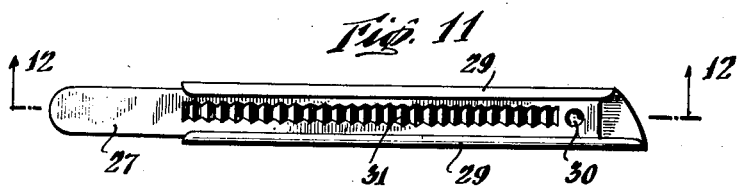
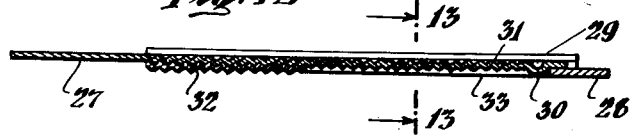
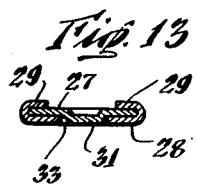
INVENTOR.
Martin L. Oscard
BY Kane, Dalsimer and Kane
ATTORNEYS ated July 16, 1957

2,799,024

COLLAR STIFFENER

Martin L. Oscard, New York, N. Y.

Application February 8, 1954, Serial No. 408,752

1 Claim. (Cl. 2—132)

This invention relates to a stiffening member for the collar of a man's shirt, and more particularly to a stiffening member of adjustable length. This application is a continuation-in-part of my prior application for United States Letters Patent Serial Number 205,100 filed January 9, 1951, now abandoned.

It is an object of this invention to provide a stiffening member for the pointed ends of a man's collar which is adjustable to collar points of varying heights. It is a further object of this invention to provide an adjustable collar stay which is as thin as non-adjustable collar stays and as flexible.

It is a still further object of this invention to provide a collar stay which is simple in construction, easy to operate and rugged.

These and other objects of this invention will become more apparent upon consideration of the following description taken together with the accompanying drawings in which:

Fig. 1 is a front perspective view of a shirt collar embodying the device of this invention;

Fig. 2 is a front elevation of the collar stay of this invention;

Fig. 3 is a vertical section of the collar stay of Fig. 2 taken on line 3—3;

Fig. 4 is a rear elevation of the collar stay of Fig. 2;

Fig. 5 is a horizontal section of the collar stay of Fig. 2 taken on line 5—5;

Fig. 6 is a front elevation showing another form of the collar stay of this invention.

Fig. 7 is a vertical section of the collar stay of Fig. 6 taken on line 7—7;

Fig. 8 is a closed section of the collar stay of Figs. 6 and 7 taken on line 8—8 of Fig. 7;

Fig. 9 is a cross section of the collar stay of Figs. 6 and 7 taken on line 9—9 of Fig. 7;

Fig. 10 is a rear elevation of the collar stay of Fig. 6;

Fig. 11 is a front elevation of yet another form of the collar stay;

Fig. 12 is a vertical section of the collar stay of Fig. 11 taken on line 12—12 of Fig. 11;

Fig. 13 is a cross section of the collar stay of Figs. 11 and 12 taken on lines 13—13 of Fig. 12;

Fig. 14 is a rear elevation of the collar stay of Fig. 11.

In general, this invention provides an extensible and retractable collar stay to fit collar points of varying heights and to stiffen or straighten the points of the collar without being visible when in place on the wearer. Referring to Fig. 1, a shirt 10 is shown having a collar 11. A point 12 of the collar 11 is shown reversed by turning upward so that the rear side is exposed to view. The point 12 contains a pocket 13 which receives the collar stay 14. The stay is inserted into the pocket when the point is thus turned up and reversed so that the stay is inserted by an upward diagonal motion and fills the collar point 12 to the bottom of the pocket which is at the apex of the collar point 12.

In Fig. 2 is shown one form of the adjustable stay 14 of this invention. The stay 14 is made of two members. A pointed member 15 is provided with two dimples 16 and 17 while a blunt member 18 is provided with a vertical row of closely spaced recesses 19. The members 15 and 18 of the stay 14 are of the same width and approximately the same length. They are adapted to cooperate in providing the stay 14 with extensibility by moving to a variety of set positions with relation to each other. Each of the members 15 and 18 are provided with a pair of ears 20 which extend from one end of each of the members 15 and 18 to hug the other member. The ears are of sufficient width to keep the two members clamped in close contact throughout the length of contact. As shown in Fig. 3, the lower dimple 16 is shown in position protruding into a recess 19 in the member 18 and held there by the contact between the members 15 and 18 provided by the clamping ears 20. In Fig. 4, the view of the back of the stay 14 shows how the ears 20 of the member 18 hug the member 15 to hold it in close contact. In Fig. 5, the enlarged horizontal section shows clearly the insertion of the lower dimple 16 in the recess 19 with the ears 20 holding the members 15 and 18 in close contact. The upper dimple 17 is provided as a stop against which the upper end of the member 18 will abut to prevent an over-contraction of the parts or their endwise slipping apart. On the other hand, upon extension the respective ears 20 on each of the members 15 and 18 will engage to prevent an over-extension of the parts or an endwise separation.

The members 15 and 18 are composed of a thin flexible material such as spring brass or spring tempered Phosphor bronze. This structure permits a rapid adjustment of the length of the stay 14. The stay is extended or shortened by endwise pressure or pull on the stay 14. The pressure causes the members 15 and 18 to bow with respect to each other in the region A lying between the ears 20. The members 15 and 18 when thus bowed in a plane perpendicular to the flat surfaces of the members 15 and 18 separate sufficiently to allow disengagement of the dimple 16 from the recess 19 in which it is set and to allow simultaneous endwise motion of the members 15 and 18 moving the dimple 16 to a new setting in another of the recesses 19. When it is desired to lengthen the stay, the pull similarly causes the members 15 and 18 to ride apart against the spring pressure of the clamping ears 20 and allow disengagement of the dimple 16 from the recesses 19.

Thus, by the combination of the clamping together of the members 15 and 18 by the ears 20 and the flexibility of the body of the members 15 and 18, a means is provided in the stay 14 for readily moving the dimple 16 with relation to the recesses 19 and, at the same time, holding the dimple tight in the recesses in any given set position under the spring pressure of the ears 20. An advantage of this invention is the ready adjustment of the parts to provide a single stay with a variety of lengths so as to permit it to accommodate almost any collar point. Another advantage of this invention is the action of the members in bowing with relation to each other to permit shifting of the set position. Among still other advantages of this invention is the simplicity of the structure of the parts which permits the members to be made and formed with a minimum of effort.

In Figs. 6, 7, 8, 9 and 10 is shown a second form of the collar stay of this invention. It is composed of two members 21 and 22 which are made of a thin flexible material such as spring brass or spring tempered Phosphor bronze. The member 21 is rounded at one end and has a dimple 24 protruding at the other end. The dimple 24 is directed toward member 22. Member 22 is in close contact with member 21 and is also held by projections 23. These projections 23 are formed of the same sheet of metal as member 22 and run for substantially the entire length of member 22 as shown in Fig. 6.

Member 22 has a slot therein 25 so located as to cooperate with dimple 24 on member 21. This cooperation limits the relative longitudinal motion of members 21 and 22. Member 22 has a longitudinal crease 26 thereon shown best in Fig. 9. This crease serves to produce a tension causing the two sides of member 22 and the projections 23 to bend toward each other. Inasmuch as member 21 is located within the projections 23 a frictional contact is thus effected between the two members 21 and 22.

It will be seen that the collar stay of this form of the invention may be adjusted to any length allowed by the lengths of the cooperative engagement of dimple 24 and slot 25. It is extended by grasping member 21 in one hand and member 22 in the other hand and applying sufficient pressure to tend to separate the two sections longitudinally. The stay is shortened by the reverse procedure. It will be seen also that the frictional contact as above described between the members 21 and 22 will serve to keep the stay at the length set since it is subjected to no more pressure that is had in the ordinary use of such a stay.

This form of collar stay as depicted in Figs. 6 through 10 has the particular advantage that it is extensible and retractable very easily and yet is thin and flexible but has sufficient resilience to provide the necessary tension in the collar slot. The two members 21 and 22, being held in contact for a greater part of their length, cannot buckle or separate and therefore the entire stay retains the length set for it during its use.

In Figs. 11, 12, 13 and 14 is shown yet another form of this invention. The two members 27 and 28 are held in contact by projections 29 as in the modification of the invention of Fig. 6. Likewise a dimple 30 on a member 27 cooperatively engages with a slot 33 in member 28 to limit the relative longitudinal motion of members 27 and 28. As shown in Figs. 11, 12 and 13 member 27 has serrations 31 thereon, and member 28 has serrations 32 thereon. These are made by stamping the members in the usual manner at the time of manufacture.

As shown in Fig. 12 serrations 31 and 32 engage with each other and serve to lock the members 27 and 28 against longitudinal movement. The flexibility of the metal utilized in this collar stay, however, is such that when longitudinal force is applied between members 27 and 28 these members flex sufficiently to allow serrations 31 and 32 to unlock. Thus, the collar stay of this form of the invention may be adjusted for length in the same manner as the preceding forms of the invention.

Various modifications of this invention can be had without departing from the spirit thereof, and for that reason it is not intended that the embodiments shown herein be limited other than by the scope of the appended claim.

I claim:

A stay to be disposed within the pocket of a collar for maintaining that collar in properly supported condition by engaging with the ends of the stay the base of the pocket and an inner collar zone surface adjacent the conventional line of fold of the collar, said stay including in combination a pair of flexible members in the form of strips disposed in superimposed relationship, means extending from one strip and slidably engaging and overlapping the other strip to maintain those strips in substantial axial alignment and one of said strips being under tension transversely of its body to draw surfaces of the strips into frictional engagement with each other, said tension being created incident to said one strip being formed of somewhat resilient material and being longitudinally creased intermediate its side edges, the other strip being substantially flat, whereby said strips will resist relative axial shifting.

References Cited in the file of this patent

UNITED STATES PATENTS

| | | |
|---|---|---|
| 805,813 | Osmers | Nov. 28, 1905 |
| 811,326 | Reynolds | Jan. 30, 1906 |
| 821,678 | Theberath | May 29, 1906 |
| 1,381,733 | O'Connor | June 14, 1921 |
| 2,454,076 | Marx et al. | Nov. 16, 1948 |
| 2,639,436 | Gavrilovich | May 26, 1953 |